UNITED STATES PATENT OFFICE.

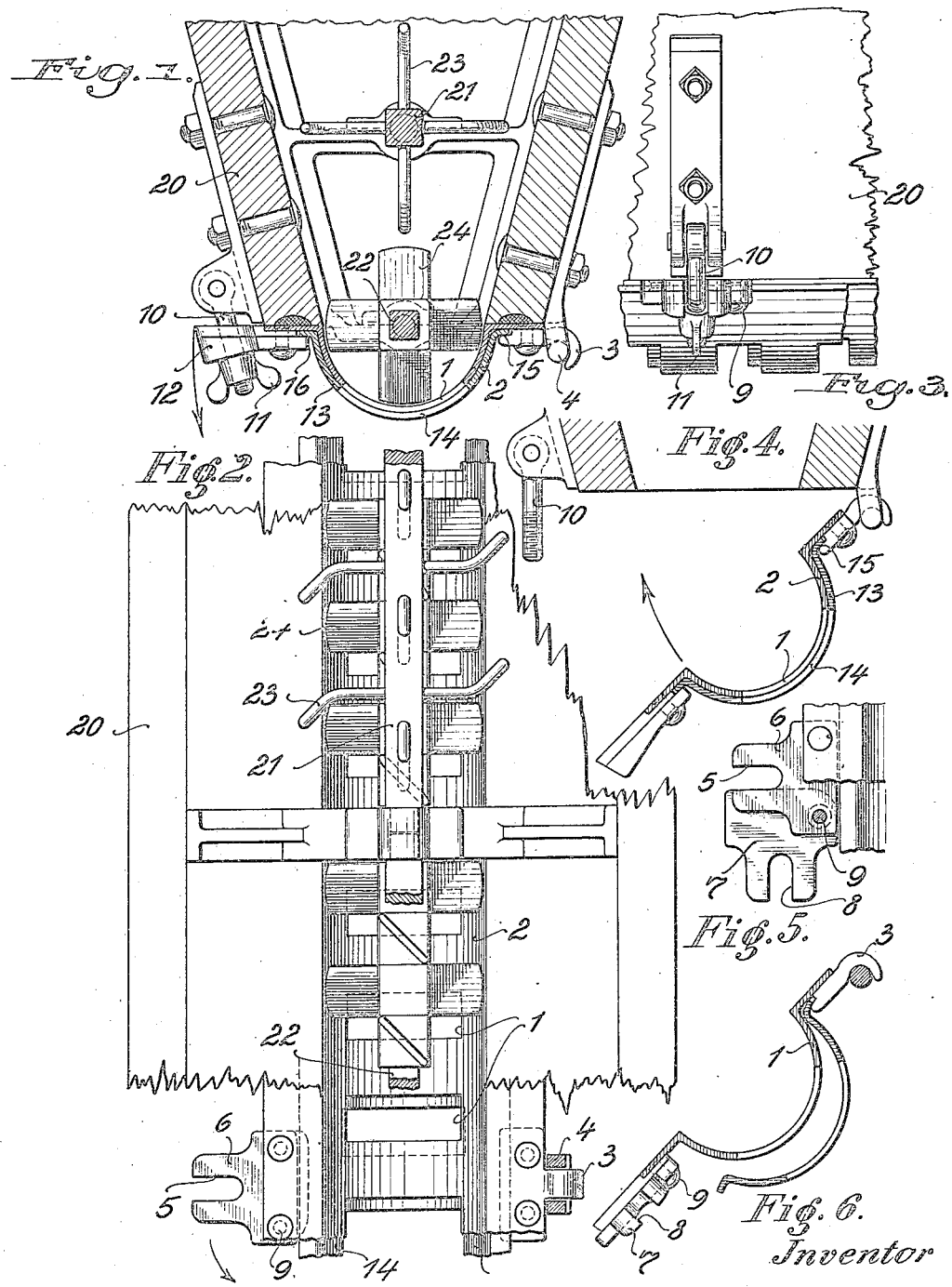

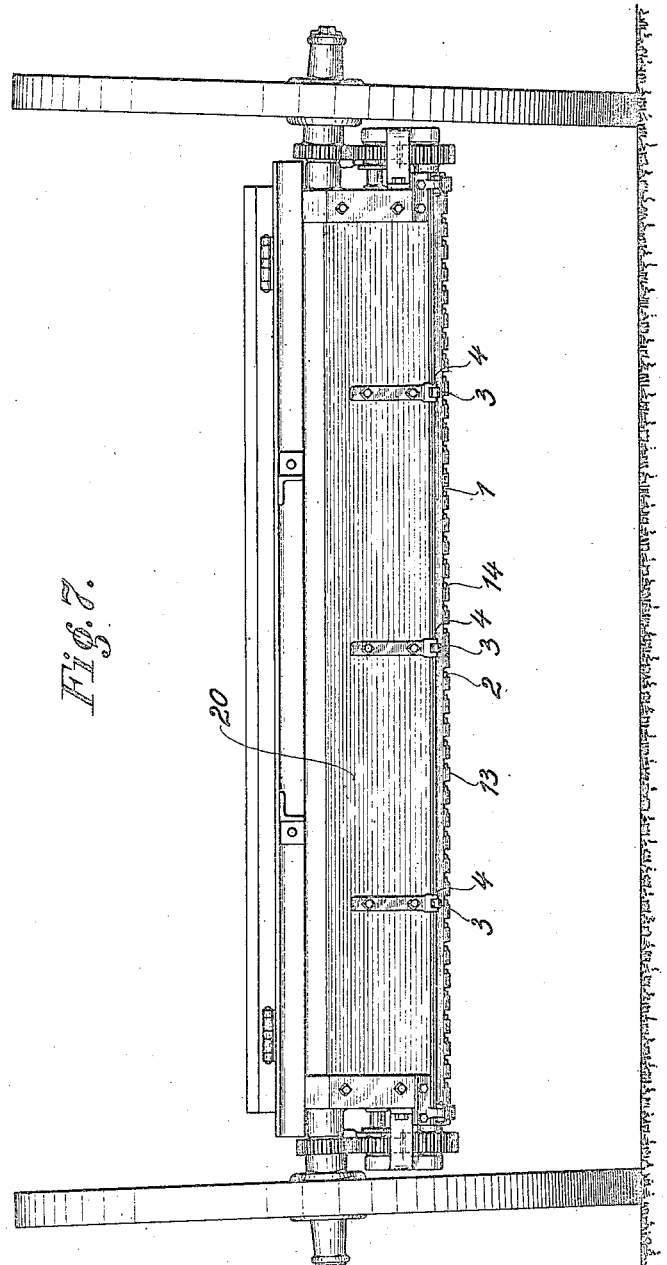

WILHELM PRINTZ, OF KETTWIG-RUHR, GERMANY.

MACHINE FOR DISTRIBUTING FERTILIZERS.

1,426,671.      Specification of Letters Patent.      Patented Aug. 22, 1922.

Application filed December 14, 1920. Serial No. 430,808.

(GRANTED UNDER THE PROVISIONS OF THE ACT OF MARCH 3, 1921, 41 STAT. L., 1313.)

*To all whom it may concern:*

Be it known that I, WILHELM PRINTZ, a citizen of the German Republic, and residing at Kettwig-Ruhr, Germany, have invented certain new and useful Improvements in a Machine for Distributing Fertilizers (for which I have filed applications in Germany, October 15, 1919; Denmark, Oct. 12, 1920; Italy, Oct. 13, 1920; Sweden, Oct. 14, 1920; Czecho-Slovakia Oct. 14, 1920; Belgium, France, Great Britain and Holland, Oct. 15, 1920, and Canada March 21, 1921), of which the following is a specification.

With the known fertilizer distributing machines it is difficult to clean the box, the bottom and the slotted gate. It is however, imperative that these parts are frequently and properly cleaned, as fertilizers are apt to cause choking and stoppages.

The present invention relates to a fertilizer distributing machine, the gate and bottom of which may be easily removed, so that they may be cleaned with great convenience.

In the accompanying drawing an embodiment of the present invention is shown by way of example, Fig. 1 being a cross section, Fig. 2 a part plan, and Fig. 3 a side elevation. Figs. 4 to 6 show a detail in two different positions. Fig. 7 is a full view of the machine.

The trough-shaped bottom 2 of the long box-shaped container 20, which is fitted on wheels, is provided with slots 1, and hooks 3 on one side, which engage in loops 4 attached to the one side of the box. On the other side of the bottom are provided ears 6 having slots 5, beneath which further ears 7, with slots 8 are pivoted by means of bolts 9. The one bolt of ear 6 may, at the same time serve as pivot 9 for ear 7. When ear 7 is swung inwards so that the slots 5 and 8 register, a screw bolt 10 pivoted to the wall of the box above may be inserted into said registering slots and by means of a wing-nut 11 the bottom may be tightly pressed against the wall of the box. By such means the bottom 2 is secured with several screws, the number of which depends on the length of the box. The lower ear 7 is wedge shaped in its two sides, 12, beside the slot 8, whereby a bevelled surface is produced on which the wing nut 11 bears.

Beneath the bottom 2 is disposed a likewise troughshaped gate 13 which also has slots 14, and serves to adjust the width of the passage through the slots 1 and 14. The one edge of this gate engages in recesses 15 in the bodies of the hooks 3, or beneath special ledges, whilst the other edge of the gate is supported on the inner edges 16 of the ears 7, as these are wider than the ears 6. After the nuts 11 have been unscrewed and the screws 10 been swung away, the bottom with the gate will drop down, pivoting on the hooks 3 (Fig. 4). Then the ears 7 are swung aside, (Fig. 5) so that their edges 6 clear the edge of the gate 13, and the latter may be removed from the bottom 2 (Fig. 6). After the parts have been cleaned, they may as quickly and easily be reassembled and attached to the box.

The hooks 3 may also be pivoted to the bottom 2 so as to more easily clear the edge of the gate, when the latter is being removed.

In place of the screws 10 with wing nuts also bayonet locks or other means may be employed for holding the bottom and the gate.

Within the box the shafts 21 and 22, revolving during the travel of the machine, are disposed, of which the former carries the agitator arms 23 and the latter the distributors 24, by means of which the fertilizer is evenly distributed over the slots 1.

I claim:

1. In a machine for dispensing fertilizer, in combination, a suitably supported supply box open below; fertilizer agitating and distributing means in said box; an adjustable readily droppable two-part gate serving as a bottom for said supply box, comprising a trough-shaped member having a series of dispensing perforations in its lower curvature, lips angularly outwardly extending from the upper longitudinal edges of said trough, means for pivotally securing said trough by one of its lips to said supply box and means for detachably clamping the other lip to said supply box; a trough-shaped slide member having perforations similar in extent and location to those in said trough, and means for readily adjustably securing said slide member underneath and in close contact with said trough.

2. In a machine for dispensing fertilizer, in combination, a suitably supported bottomless supply box with downwardly converging longitudinal walls and fertilizer agitating and distributing means therein; a plurality of eye members dependingly secured to one side wall of said supply box and a plurality of screw bolts adapted to receive nuts swingingly depending from the other side of said supply box; an adjustable, readily demountable dispensing bottom gate for said box, comprising a trough-shaped, end-closed member having a series of perforations in its lower curvature, a lip or flange angularly extending from the one longitudinal edge of said trough, a plurality of hooks or claws extending outwardly from said lip and adapted to co-operate with said eye members depending from said box; a lip or flange angularly extending from the other longitudinal edge of said trough, and ear members extending outwardly from this second said lip and adapted for co-operation with said swinging screw bolts on said box; a slide of substantially the same conformation as said trough and having similarly shaped and disposed perforations; and means for longitudinally displaceably supporting said slide in close proximity below said trough.

3. In a machine for dispensing fertilizer, in combination, a suitably supported bottomless supply box, a plurality of eye members and a plurality of screw bolts respectively secured to the lower edges of the oppositely disposed longitudinal walls of said box; a readily demountable dispensing bottom gate for said box, comprising a trough-shaped member having a series of perforations in its lower curvature, a lip angularly extending from the one longitudinal edge of said trough, a plurality of hook members extending outwardly from said lip and each hook being recessed in its inner upper part, said hooks adapted for co-operation with said eye members; a lip angularly extending from the other longitudinal edge of said trough, a plurality of slotted ear members extending outwardly from said second lip and each ear member comprising a flap rigidly secured to said lip and a similar flap eccentrically pivoted thereon below the rigid flap, the outwardly open slots of each two connected flaps, when in register, adapted to receive the respective screw bolt, and the eccentrically pivoted ear flap, when in registering position, extending somewhat farther inwardly than the superposed companion flap; a slide of substantially the conformation of said trough but with somewhat narrower longitudinal edge lips and having similarly shaped and disposed dispensing perforations, the one narrow lip of said slide adapted to engage in said recesses of said hooks, and the opposite narrow lip adapted to be locked in place by said eccentric lower ear flap; agitating means in said supply box, and distributing means therein operable partly in said supply box and partly in said dispensing trough.

In testimony whereof I affix my signature.

WILHELM PRINTZ.